United States Patent [19]
Noel

[11] Patent Number: 5,906,399
[45] Date of Patent: May 25, 1999

[54] THREADED JOINT FOR METAL TUBES WITH INTERNAL COATING

[75] Inventor: Thierry Noel, Sebourg, France

[73] Assignee: Vallourec Oil & Gas, Aulnoye-Aymeries, France

[21] Appl. No.: 08/772,465

[22] Filed: Dec. 23, 1996

[30] Foreign Application Priority Data

Dec. 22, 1995 [FR] France .................................. 95 15412

[51] Int. Cl.⁶ ...................................................... F16L 25/00
[52] U.S. Cl. ............................................. 285/55; 285/333
[58] Field of Search ............................... 285/55, 333, 355

[56] References Cited

U.S. PATENT DOCUMENTS

| | | | |
|---|---|---|---|
| 2,532,632 | 12/1950 | MacArther | 285/55 |
| 3,100,656 | 8/1963 | MacArthur . | |
| 3,192,612 | 7/1965 | Elliott et al. . | |
| 3,489,437 | 1/1970 | Duret | 285/55 |
| 3,499,666 | 3/1970 | Turner | 285/55 |
| 4,373,750 | 2/1983 | Mantelle et al. . | |
| 4,568,113 | 2/1986 | Axford et al. | 285/55 |
| 4,856,828 | 8/1989 | Kessler et al. | 285/55 |
| 4,875,713 | 10/1989 | Carstensen . | |
| 5,236,230 | 8/1993 | Mudge, Jr. et al. . | |

FOREIGN PATENT DOCUMENTS

| | | |
|---|---|---|
| 027771 | 4/1981 | European Pat. Off. . |
| 0 094 509 | 11/1983 | European Pat. Off. . |
| 0 488 912 | 6/1992 | European Pat. Off. . |
| 1 947 306 | 4/1971 | Germany . |
| 446334 | 1/1950 | Italy .................................. 285/55 |
| 7-301375 | 11/1995 | Japan . |
| WO 89/08214 | 9/1989 | WIPO . |

*Primary Examiner*—Eric K. Nicholson
*Attorney, Agent, or Firm*—Oblon, Spivak, McClelland, Maier & Neustadt, P.C.

[57] ABSTRACT

The invention concerns threaded joints for tubes, having a layer intended in particular to protect the tubes and the joints from corrosion or to improve the conditions for a flow of fluids. The joint comprises two tubular threaded components each provided with a radial annular surface. The internal wall of the components and the annular surfaces are covered with a layer. The shape of the annular surfaces is such that in the screwed state those surfaces are partially in abutment contact at their external portion, their internal portion creating a progressive opening zone which is at least partially filled by the layers of the two components.

24 Claims, 4 Drawing Sheets

THREADED JOINT FOR METAL TUBES WITH INTERNAL COATING

BACKGROUND OF THE INVENTION

1. Field of the Invention

The present invention relates to the use of layers or coatings on tubes and threaded joints for tubes, particularly for protecting them from corrosion or for improving the fluid circulation conditions in the interior thereof.

The invention further relates to the tubes and threaded joints for metal tubes which are provided with such an internal coating or layer. Such tubes and threaded joints are used for exploiting deposits of oil and gas, in particular for wells into which injections of water are effected.

The invention further relates to any tube and threaded joint associated therewith, which because of the conditions of use are subjected to severe corrosion by virtue of contact with the fluid flowing therein. This is particularly, and in a non-limiting fashion, the situation with tubes and threaded joints used for circulating water as in, e.g., oil wells or geothermal wells, due to the composition and temperature of the water in contact with the tubes.

2. Discussion of the Background

The internal walls of tubes and the components of joints associated with those tubes may be protected from corrosion by a thin adhesive layer of a plastic coating such as a resin based, e.g., on a polyepoxide. Such a coating has excellent adhesion to steel and very good resistance to corrosion. Irrespective of such corrosion problems, such coatings are also used on tubes and the components of joints associated with those tubes to reduce pressure drops, in particular to reduce the roughness of the surface of the internal wall of the tubes and the components of the joints, and to eliminate to the maximum degree the turbulence phenomena which may occur at the internal walls of the tubes and joints when the fluids are flowing therethrough.

However, at the location of a joint between, e.g., the annular surface of the male end of a tube portion and an annular surface forming an abutment of the female component of the joint, it is found that when the joint is screwed together, the tightening pressure tends to cause the protective coating to crack and split in the immediate vicinity of the contact zone. This results in flaking and very substantial localized corrosion of the subjacent metal thus exposed; in the situation where the coatings are used to improve the surface quality of the walls in contact with the flow of fluid, this results in disturbances in the flow of fluid.

Even if the corrosion involved does not cause immediate leaks, it prevents re-use without repair of the components of the joint after it has been unscrewed. That corrosion may even result in destruction of the abutment zones and the sealing surfaces of the joints.

Different solutions for preventing such localized corrosion have been proposed. They involve sealing rings of elastomers or of certain plastic materials.

Some sealing rings, such as those made of polytetrafluoroethylene (PTFE), have the combined advantages of good mechanical strength and excellent resistance to corrosion and good compatibility with the plastic coatings used for metal tubes and their means of assembly. The rings used may be reinforced by glass or carbon fibers.

A number of examples describe the use of such rings.

Thus, U.S. Pat. No. 3,100,656 describes an assembly of integral type in which the threaded male end of a tube portion is fitted by screwing into a female housing of another tube portion. The internal walls of the tubes and the components of the joint are coated with a layer of a phenolic resin such as phenol formaldehyde, measuring from 0.002 to 0.006 inch (from 0.05 to 0.15 mm). A sealing ring based on polytetrafluoroethylene is partially engaged into an annular housing in the female wall bearing against a shoulder thereof. The ring is of an I-shaped section such that its enlarged external zone engages into the housing while the end of the male element, at the end of the screwing operation, tightens a lateral edge of the ring against the shoulder. The degree of tightening is limited by abutments.

U.S. Pat. No. 4,875,713 describes another method of assembling two tube portions. This involves a sleeve permitting end-to-end assembly of the male ends of two tube portions. The internal wall of the tube is protected from corrosion by a plastic coating formed by a layer of phenolic resin, or epoxyphenolic resin, or by epoxypolyamides. The ring is mounted at the middle of the sleeve in a double groove. The ring is a ring of PTFE reinforced by 5% of glass fibers and 5% of carbon fibers; it is of a reversed U-shape, with the two arms of the U being engaged into two parallel grooves. The two front ends of the male elements partially cover over the top of each arm of the U-shape, thus blocking the joint in its housing. Abutment shoulders at the ends of the sleeve control the degree of screwing of each element.

U.S. Pat. No. 5,236,230 describes an assembly similar to that of U.S. Pat. No. 4,875,713. However, U.S. Pat. No. 5,236,230 uses a ring of PTFE whose section is substantially rectangular, and whose radial height is about 1.5 times the width as measured parallel to the axis. As shown in FIGS. 4 A and 4 B, when the opposite front male ends are clamped against the ring, its initially rectangular section is deformed into a T-shape and its internal surface defines a flow section equal to the flow section of the tubes, which prevents any disturbance in the flow of fluid. The clamping effect is controlled by stop shoulders. There is no disclosure regarding the risks of cracking of the coating at the right angles, or the nearly right angles, which are shown in FIG. 4 B.

Although those different methods of protecting the junction zone of such joints from corrosion have certain advantages, they all suffer from the disadvantage of using rings of elastomer or plastomer which in themselves involve significant problems. Those rings generally have to be set in place with precision in order for them to bear correctly against the sealing surfaces; at each unscrewing and re-screwing operation, they must also be carefully checked and in most cases replaced, because of ageing or plastic deformation. In the case of the relatively rigid rings, such as those of PTFE, they can be severed if they are badly positioned and they may also give rise to cracks in the plastic coating, which is much softer. The rings can thus be expelled from their housing and can be disposed in the interior of the tube, or may be torn away or damaged when the tubes are subjected to internal checking. It is also noted that, at operating sites, e.g., production facilities, such rings necessitate additional handling operations which must be carried out with precision.

SUMMARY OF THE INVENTION

Accordingly, one object of the invention is to improve the resistance of the layers or coatings deposited on the internal walls of the tubes at the location of the junction of the tubes without using rings, whether those layers are used for affording protection from corrosion, for reducing pressure drops in the tubes, or for any other use.

Another object of the present invention is to avoid the use of sealing rings of elastomers or plastomers such as PTFE.

Another object is to provide a joint allowing a substantial number of operations of unscrewing and re-screwing the junctions of tubes or portions of metal tubes which are coated with a plastic layer and without involving any rings, without causing flaking of that layer in the sealing connecting zone between the end of a tube and another component of the joints, which flaking causes rapid corrosion of the subjacent metal.

Another object is to suppress the sealing rings both in the case of a connection between male ends of two tube portions, which is produced by a sleeve comprising two female housings, and in the case of a direct connection, which is referred to as "integral", between the male end of a tube portion and the female end of the following tube portion.

The joint for metal tubes according to the invention permits the assembly with corrosion protection, of two tubes fitted together by threads.

The joint comprises two tubular components each provided with a thread for assembly thereof, the tubular components being provided on the ends of tubes or tube portions to be fitted together.

Assembly of the two components is effected by screwing and tightening at least one component comprising a male thread in a corresponding threaded female housing.

Each component comprises a tubular internal zone which corresponds to the internal wall of the component in question in the vicinity of the junction zone. The diameter of the tubular internal zone will be the same as the internal diameter in a running part of the tube, on the end of which the component is provided, or will be slightly different from the internal diameter in the case where the end of the tube has been preformed, e.g., by making it conical, before the component is produced thereon.

The tubular internal zone is prolonged at the location of the junction by an annular surface of general radial orientation with respect to the tubular internal zone.

The annular surfaces of the two components are designed so that, upon assembly of the joint, they are in common abutment contact at a part of their surface which is disposed towards the exterior of the component. The common abutment contact involves a common contact generatrix, in a section plane passing through the axis of the joint, over a fraction of the total radial extent of those annular surfaces.

The common contact generatrix is advantageously formed by a segment of a straight line which may either be perpendicular to the axis of the joint or inclined with respect to said axis of the joint. It may also be formed by any segment of a curve of constant or variable curvature.

The tubular internal zone of each component is covered with a protective layer which is meant to protect the metal from corrosion due to the fluid flowing in the interior of the components, or for any other purpose, e.g., to reduce pressure drops. The protective layer is prolonged from the tubular internal zone, for each of the components, over at least a fraction of the radial extent of the annular surface defined above.

Over the fraction of the radial extent of the annular surfaces, which is disposed on the side of the tubular internal zone where those surfaces are not in contact in the screwed state, imparted to each of the generatrices defining each of the annular surfaces, and disposed in a section plane passing through the axis of the joint, is a shape such that, in the screwed state, the generatrices form a progressive opening as from an initial point of common contact, the axial distance between the two generatrices progressively increasing on going from the initial point towards the axis of the joint and the two generatrices rejoining the tubular internal zone of their respective component.

The progressive opening is created by departing from the natural geometrical prolongation of the common contact generatrix towards the interior of the component, for at least one of the annular surfaces.

Prior to the first screwing operation the layer will extend over a more or less substantial fraction of the annular surfaces. It may for example cover a part of the abutment zones of each component beyond the initial point, or it may stop in the vicinity of the initial point.

By way of example and without limitation the opening may assume the shape of a V, each of the sides of the opening corresponding to a conical surface centered on the axis of the joint.

When the joint is assembled with the annular surfaces in abutment contact, the opening is so dimensioned that the opening is at least in part filled by the protective layers of the two components, said layers being in contact with each other.

The opening, characterized by its angle of opening at the initial point and its length, will advantageously be so determined that the contact pressures between the two coating layers progressively decrease from the initial point to the end of the opening, the layers remaining in contact over at least a part of the length of the opening.

Thus, by appropriately selecting the position of the initial point—on the one hand retaining a common contact generatrix of sufficient length to absorb under good conditions the screwing and/or compression forces which occur in operation and, on the other hand providing for distribution of the pressures created by contact of the abutment surfaces in the coating layer such that progressive decompression takes place in the opening—the layer retains in the opening and due to the shape thereof sufficient overall cohesion so that no part of the metal is exposed without a protective layer.

In a highly advantageous manner, the opening will be so dimensioned that it is prolonged substantially to the point where the two layers are no longer in contact with each other. This makes it possible to avoid creating in the flow of fluid in the tube a recess or a discontinuity in diameter which may give rise to turbulence or an accumulation of flowing fluid.

The angle of the opening will depend on the radial length of the generatrix which is available from the initial point. In practice, examples of the angle include, but are not limited to from 5 to 30°, preferably from 5 to 15°. The angle should preferably not be greater than 30° in order to achieve progressive decompression of the coating layers, as explained above.

If, e.g., the opening is in the shape of a V, it will be seen that, if the length of wall necessary for decompression of the coating layers is identified by "L", for a layer of a thickness "e" and a total angle of opening "X", that gives $L=e/\sin X/2$.

If for example $e=0.1$ mm and $X=10°$, then $L=1.15$ mm. It is possible to create the fixing zone of the layer which performs an essential function by increasing the value of "L" which is found in that way. It is possible to distribute the angle of opening between the generatrices of the zone of opening of the two components so as to provide, e.g., a symmetrical arrangement. It is also possible to provide the angle only on a single component.

Beyond the opening zone, the coated wall is connected to the tubular internal zone of the corresponding component.

In the connecting zone, it is also important to reduce to a minimum the stresses due in particular to geometrical and temperature variations, and shapes with acute angles will preferably be avoided. When there is an angle, e.g., 90° with the generatrix of the tubular internal zone in that connecting zone, there will preferably be a chamfer, e.g., at about 45°, which is possibly connected by rounded portions or angles which are cut away, e.g., by sand blasting, or any other general progressive shape will be used.

Tests carried out have shown the possibility of thus producing joints in accordance with the invention as between two components which are coated on their tubular internal zone with a layer of epoxy type, which can withstand about ten (10) unscrewing and re-screwing operations, after a first initial screwing operation, without noticeable deterioration and even without any deterioration at all in the coating layer.

In particular, except in the abutment contact zone of the annular surfaces where the layer has been worn away, there remains everywhere an adhesive film in contact with the metal which is sufficient to protect the metal, the abutment contact zone of the annular surfaces being protected by the layers filling the opening.

DESCRIPTION OF THE PREFERRED EMBODIMENTS

The basic structure of the joint according to the invention as already described may be designed in a number of different ways including, but not limited to the two embodiments set out hereinafter.

In a first embodiment of the joint the two tubular components are two male elements and each comprise an external thread in the vicinity of their ends. Each of those components comprises in the vicinity of its end a tubular internal zone which is prolonged at the end of the component by a front annular surface of general radial orientation.

Each of those two components is engaged into a housing comprising a female thread corresponding to the male thread of the component which is to be engaged therein, the two housings being provided at the two ends of a coupling sleeve. The shape and the length of the coupling sleeve permit the annular surfaces of the two components to come into abutment contact at a part of their surface disposed on the external diameter side of said components, upon assembly of the joint by screwing and axial tightening.

The zone which is disposed in the interior of the sleeve, between the two housings with the female thread, permits the passage of the ends of the male components of the joint and may be designed in addition to perform different functions. It is thus possible to provide on the internal zone shapes which make it possible to provide for a sealing effect by means of metal-metal sealing surfaces as between each component of the joint and the sleeve, which sealing surfaces may be, e.g., conical surfaces involving a relatively shallow taper, e.g., of the order of 2° to 30°, preferably 5° to 25°, more preferably 10° to 20°, relative to the axis of the joint.

It is also possible to provide, both on the sleeve and on the male component or components, abutment shoulders which make it possible to achieve precise centering of the two components in the sleeve, while providing for screwing and tightening of the joint.

In a second embodiment, the joint comprises a male component with an external thread, which component is provided in the vicinity of its end with a tubular internal zone which is prolonged at the end of said component by a front annular surface of general radial orientation.

The other component is a female component provided with an internal thread forming a housing in the vicinity of its end. Beyond the internal end of the thread, the component comprises a tubular internal zone which is prolonged at its thread end by an annular surface of general radial orientation. The female threaded housing into which the male component is screwed is formed by the female component itself, being a component whose dimensions, shape, and thread are designed to correspond in every way to the male component, and upon assembly by screwing and tightening, and are designed to permit the annular surface of the male component to come into partial abutment contact with the annular surface of the female component at the external diameter side of the tubes.

Between the annular surface and the thread of each component, the shapes of the two components may make it possible to effect different functions, e.g., affording sealing integrity by means of metal-metal sealing surfaces in accordance with well-known principles and configurations.

In the second embodiment of the basic structure of the joint which has just been described, the female component may be designed at the end of a tube of great length. This involves a joint, called an "integral joint", for directly connecting two tubes together. Preferably, diametral expansion of the female component and diametral contraction of the male component are effected beforehand, to provide the desired thicknesses of metal using procedures well-known to the skilled artisan.

In an alternative configuration of the second embodiment the female component may be formed by the end of a coupling sleeve which also constitutes a housing for the male component, the second end of the sleeve permitting housing of another tube provided with an end having a male thread, the connection then operating under the same conditions at the two sides of the sleeve, with the two housings being separated by a flange portion of which the internal wall constitutes the tubular internal zone of the female component.

It will be appreciated that in all the embodiments of the basic structure of the joint, which has been described hereinbefore, the tubular internal zones and the annular surfaces which prolong them are coated with a layer which extends as already described, e.g., to the vicinity of the initial point.

Those layers which can be intended to provide protection from corrosion or to perform other functions may be made of any known materials used for the deposit of thin layers on metals to perform a required function and they may be deposited by using any known procedures. Thus, without this constituting a limitation, it is possible to use layers based on plastic material, e.g., a polyepoxide, often referred to as epoxy layers. In order to increase their resistance to wear, the layers may also contain non-metallic particles, e.g., glass, carbon, or ceramics, in a binder of plastic material permitting them to be deposited under good conditions.

It will be appreciated that such a layer will also be deposited over the whole of the interior of the tubes which are assembled by the joint according to the invention.

When the annular surface of the second component is a surface which forms part of a female housing, into which is screwed the threaded male end of the first component whose annular surface comes to bear partially against said surface, it is possible in known manner to complete the arrangement according to the invention by providing for metal/metal sealing integrity between a surface, e.g., of the convex frustoconical type, which is disposed in the immediate vicinity of the front end of the male component on its external wall and a corresponding surface, e.g., of the concave frustoconical type, which is provided on the wall of the female housing, the inclination of the substantially parallel generatrices of those two surfaces with respect to the axis of the joint being, e.g., about 2° to 30°, preferably 5° to 25°, more preferably 10° to 20°.

This arrangement guarantees excellent sealing integrity in relation to internal or external over-pressures to which the joint according to the invention is subjected.

The layer which is deposited before the first screwing operation may cover the whole of the annular surfaces. The layer, in the part where the annular surfaces will be in abutment contact, will have a tendency to be damaged by contact pressure. Due to the controlled opening created between the annular surfaces in the screwed-together state, that however does not prevent attaining cohesion of the protective layer on the parts of the components which are subjected to corrosion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

Referring now to the drawings, wherein like reference numerals designate identical or corresponding parts throughout the several views, the present invention is explained with reference to FIGS. 1, 2, 3, and 4:

FIG. 1 shows in its central part and on a greatly enlarged scale the non-threaded end zones 1, 2 of the two male components 3, 4 of the joint 5 which is shown in axial section, only the part of the section which is above the axis X1—X1 of the joint being shown, those components 3,4 being provided on the ends of the tubes (not shown in the Figure) which are to be fitted together.

Figure 1:
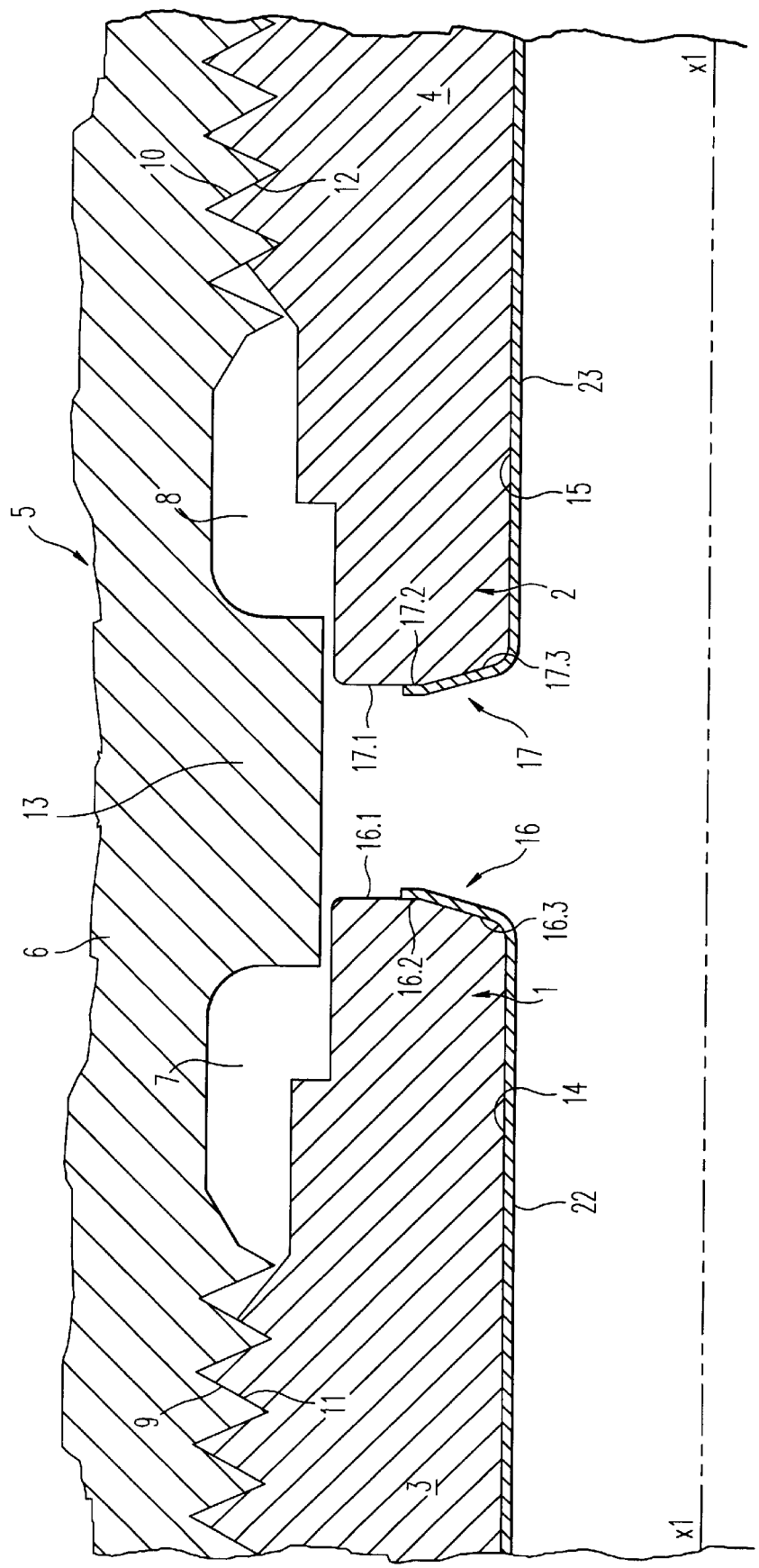
FIG. 1 is a diagrammatic view in section showing the central part of a joint according to the invention in the case involving assembly by means of a sleeve of two male components which can come into abutment contact in the screwing operation.

As can be seen from the Figure those two male components 3, 4 are assembled by means of a sleeve 6. On each side the sleeve has a female housing 7, 8 whose thread 9, 10 corresponds to the thread 11 and 12 respectively of each of the male components 3 and 4. The thread, which is not represented in detail, is here a tapered thread, the loaded side of which will advantageously be a side with a negative angle of inclination.

In its central zone 13 the sleeve 6 is of a rotationally symmetrical cylindrical shape which permits the ends 1, 2 that are also cylindrical of the male components to engage therein at each side.

At its end 1, 2 each male component 3, 4 comprises a tubular internal zone 14, 15 which here corresponds to the internal wall of the tube constituting the component. The tubular internal zone is prolonged by an annular surface 16, 17 of general radial orientation and which is disposed in frontal relationship at each end 1, 2. The annular surface, in its portion which is disposed towards the external side of the component comprises a flat surface 16.1, 17.1 produced by a generatrix formed by a segment of a straight line which is perpendicular to the axis X1—X1.

Figure 2:
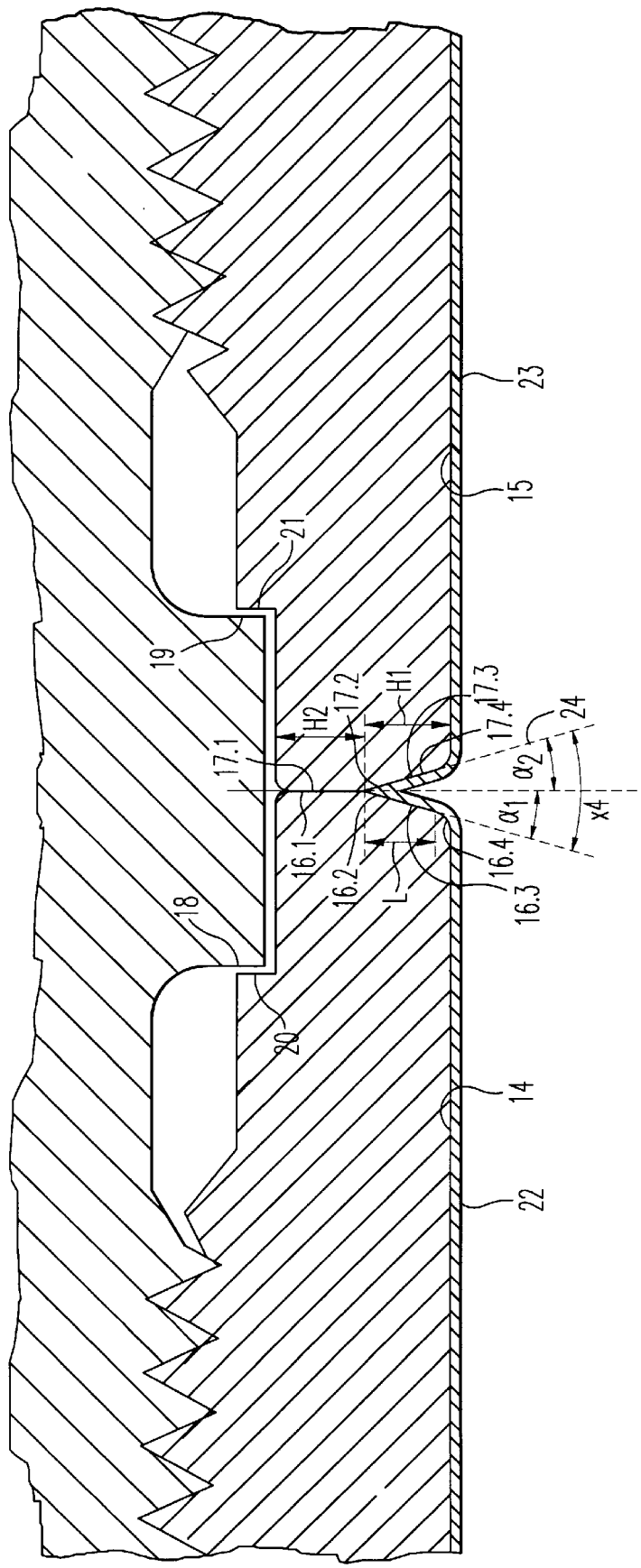
FIG. 2 also shows a view in section of the ends of the two male components of FIG. 1 in abutment contact.

FIG. 2 shows the joint of FIG. 1 in the tightened screwed condition.

The surfaces 16.1 and 17.1 are then in abutment contact, which may be of more or less sealing nature.

In order for the joint to be perfectly centered, provided on the sleeve on each side of the central cylindrical portion and before the beginning of the threaded zone is a centering shoulder 18, 19 to which there corresponds a corresponding shoulder 20, 21 on each of the male components, those shoulders being so designed that, when the annular surfaces 16.1, 17.1 are in abutting contact, at least one of the shoulders 20, 21 of the male components is not in contact with the corresponding shoulders 18, 19 of the sleeve 6. Here only the centering shoulders 19, 21 are in abutting contact.

As from the point 16.2, 17.2, the annular surfaces 16, 17 have a slope with respect to the geometrical natural prolongation of the generatrix of the abutment surface 16.1, 17.1, before going to rejoin their respective tubular internal zone 14, 15. Thus the surfaces 16.3, 17.3 are here of a general conical shape with an axis X1—X1 which is prolonged by a rounded portion 16.4, 17.4.

The generatrices of the surfaces 16.3, 17.3 form an angle α1 and α2 with the common plane which is perpendicular to the axis X1—X1, α1 here being equal to α2.

An epoxy layer 22, 23 is deposited prior to the first screwing operation on the internal surface of each male component 3, 4 and covers it carefully in order to protect it from corrosion. The layer extends over the tubular internal zone 14, 15 and extends beyond the above-defined point 16.2, 17.2 over a part of the abutment contact surfaces 16.1, 17.1.

It will be appreciated that the layer is not shown to scale in the Figure in order better to bring out the description in this respect.

It will be seen from FIG. 2 that the progressive opening zone 24 formed by the conical surfaces 16.3, 17.3, when the joint is screwed tight, is at least partially filled by the protective layers 22, 23 which are crushed against each other in the upper part of the V-shape of the opening before regaining their original structure in the lower part of the V-shape.

The layer 22, 23 has also been crushed in the abutment contact zone 16.1, 17.1 and partially urged into the opening of the V-shape.

By way of example the layer may be of a thickness in its general part of the order of 0.15 mm.

If the angles α1 and α2 are 10° the total opening angle X4, from the initial point 16.2, 17.2, is then 20°.

For L, the length over which the layers of the two components will be in contact or compression and will fill the opening 24, that gives a minimum value of 0.15 mm (thickness)/0.174(sin 10), that is to say 0.86 mm.

In fact, a part of the protective layer having been compressed in the opening 24, the value of L will in practice be greater than 0.86 mm, and it may attain, e.g., 1 mm.

Thus, the thickness H1 between the tubular internal zone 14, 15 and the inflection point 16.2, 17.2 of the surface 16, 17 may be given a value of the order of 1.5 mm, which makes it possible to ensure a connection to the zones 14, 15 under good conditions and to retain in practice a thickness H2 in respect of the abutment contact surface 16.1, 17.1, that is sufficient to ensure satisfactory operation of the joint without plasticization of the abutment surfaces when screwing takes place.

It is noted that such a joint structure may be screwed together and unscrewed a certain number of times while guaranteeing protection from corrosion under good conditions.

The protective layer 22, 23 which is deposited prior to the first screwing operation may not cover the whole of the conical surfaces 16.3, 17.3 or extend beyond the points 16.2, 17.2, as described above. The important consideration is that the layers 22, 23 are brought into contact, preferably in compression, in the opening zone 24 when the joint is screwed together so that the metal is not exposed and subjected to corrosion due to the flowing fluid.

Figure 4:
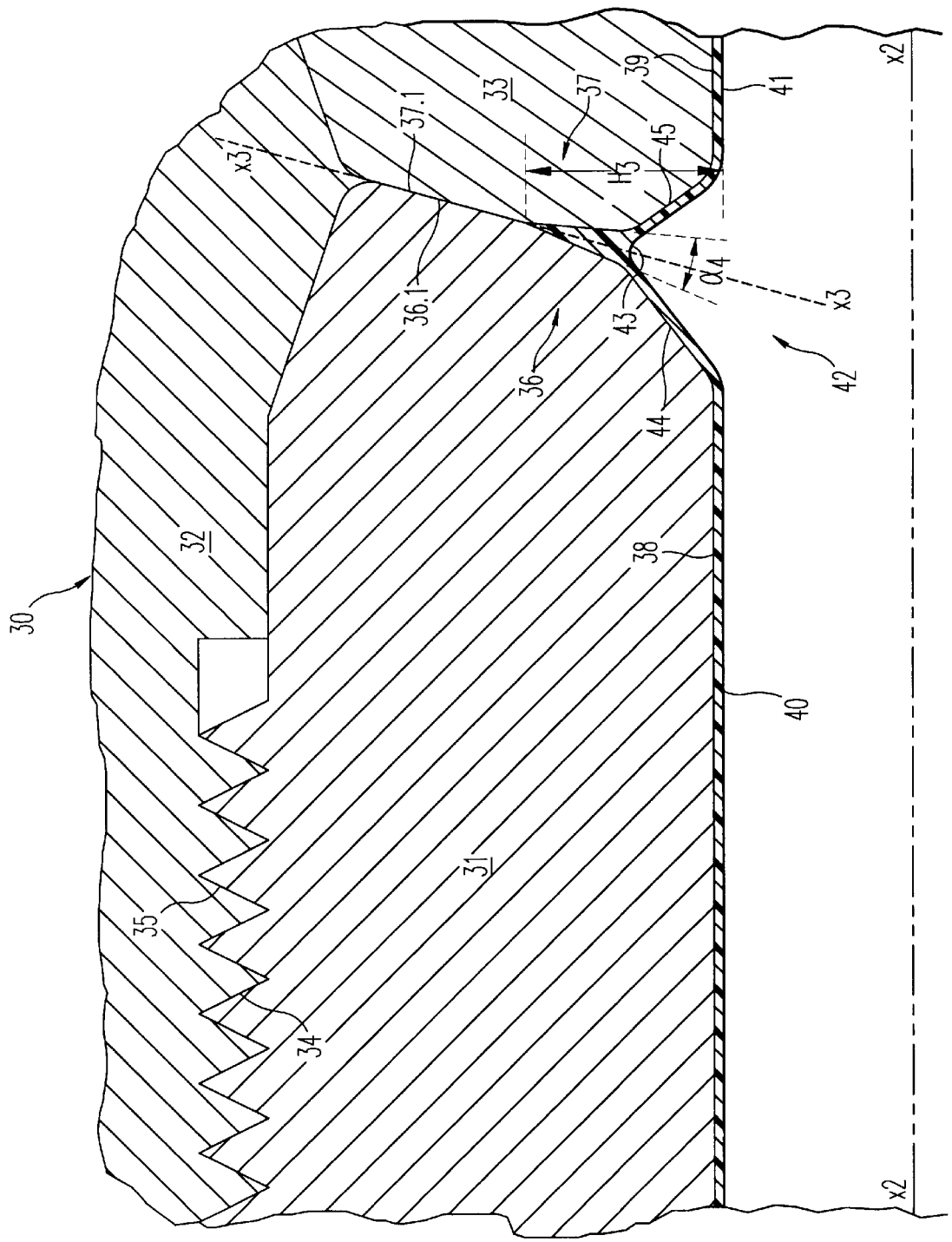
FIG. 4 is a diagrammatic view in section of a joint according to the invention wherein the male component is screwed into a female component provided in a sleeve.
Figure 2:
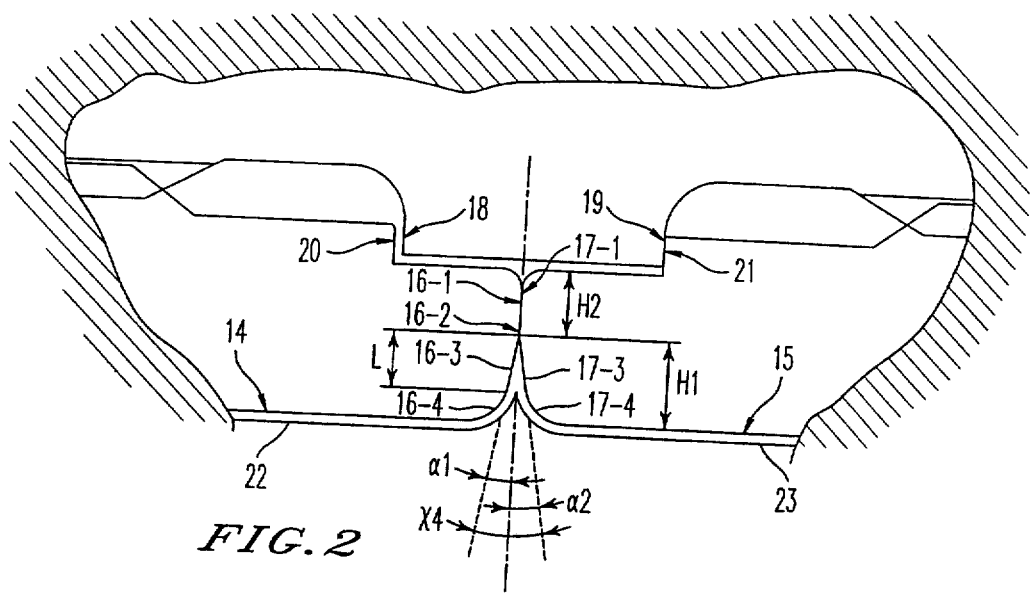
Figure 3:
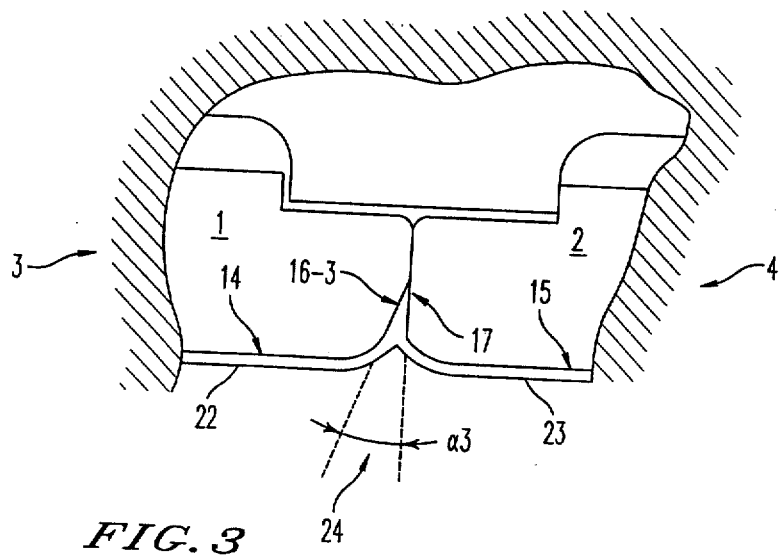
Figure 4:
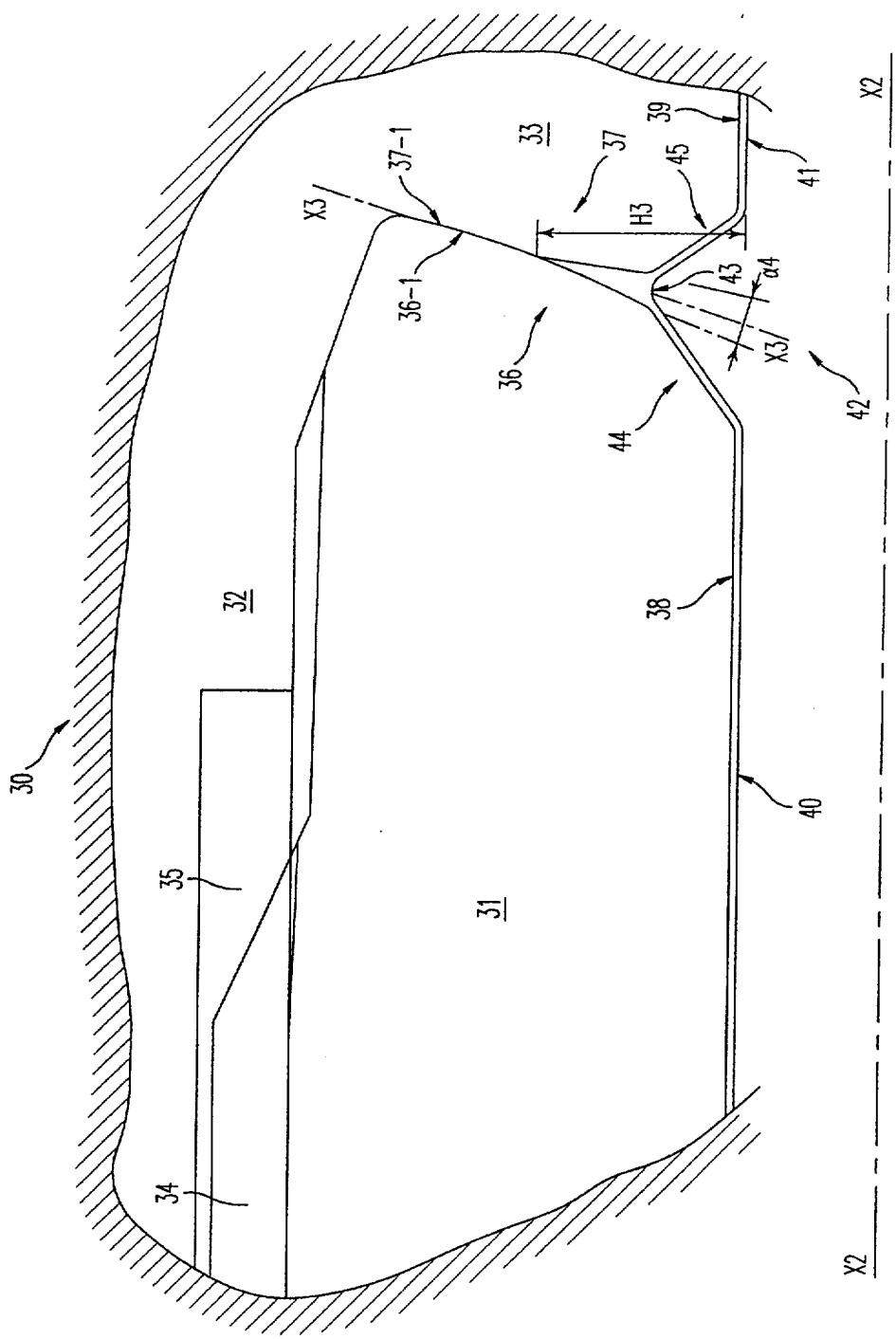
Figure 1:
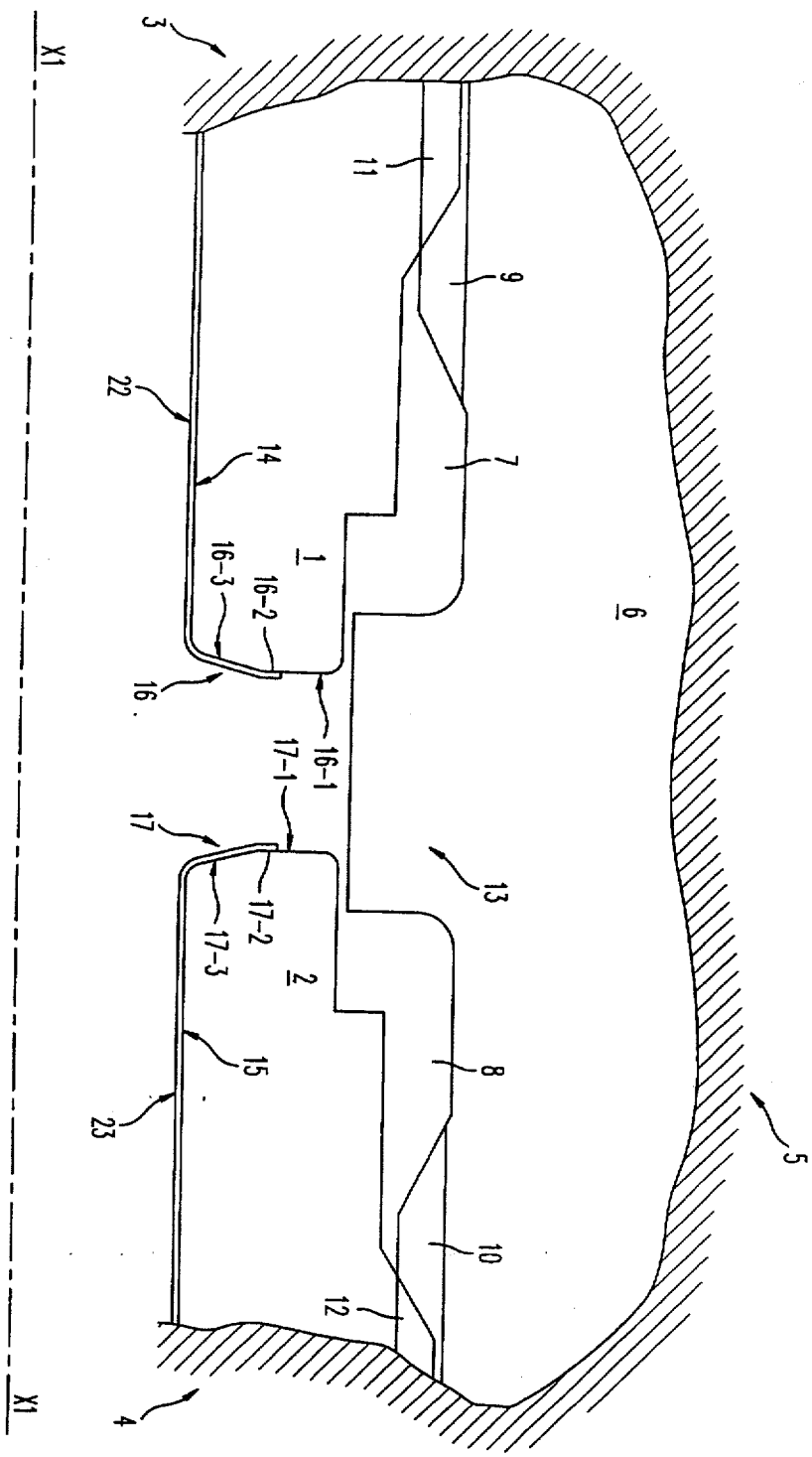
Figure 2:
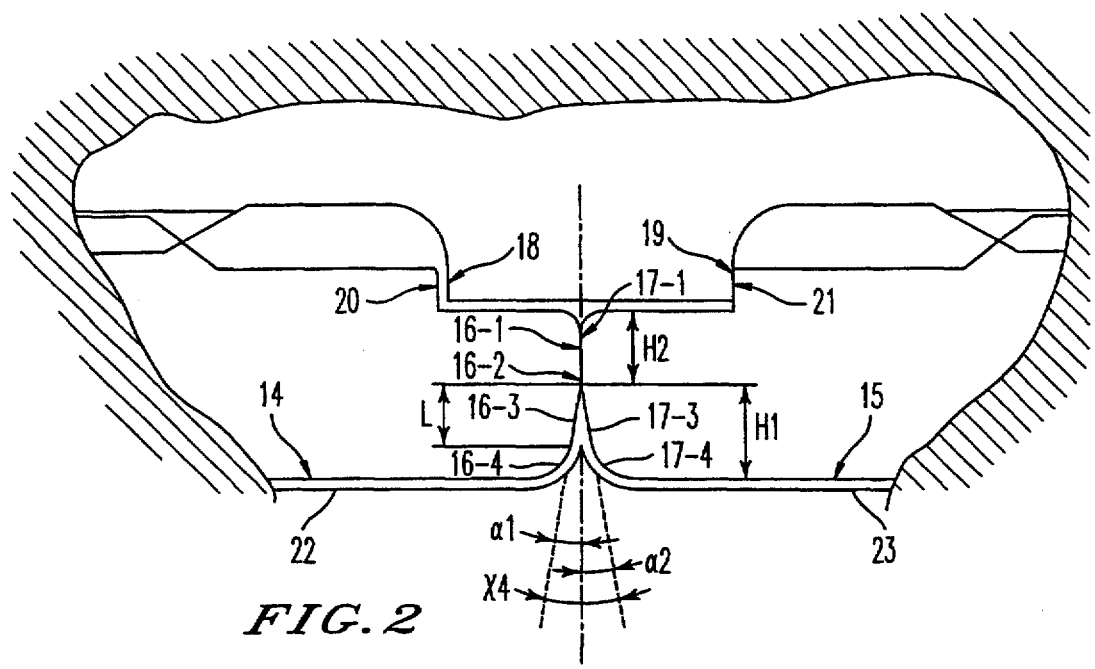
Figure 3:
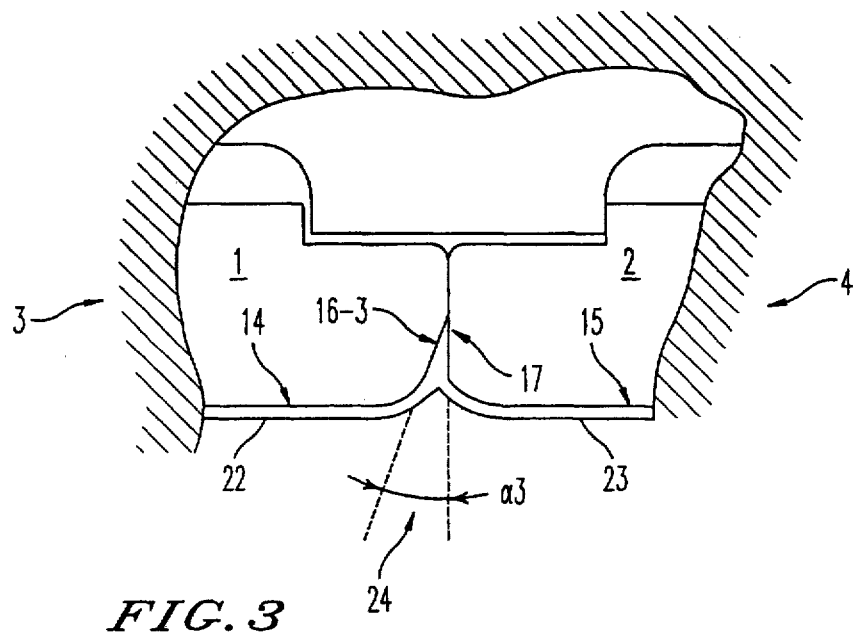
Figure 4:
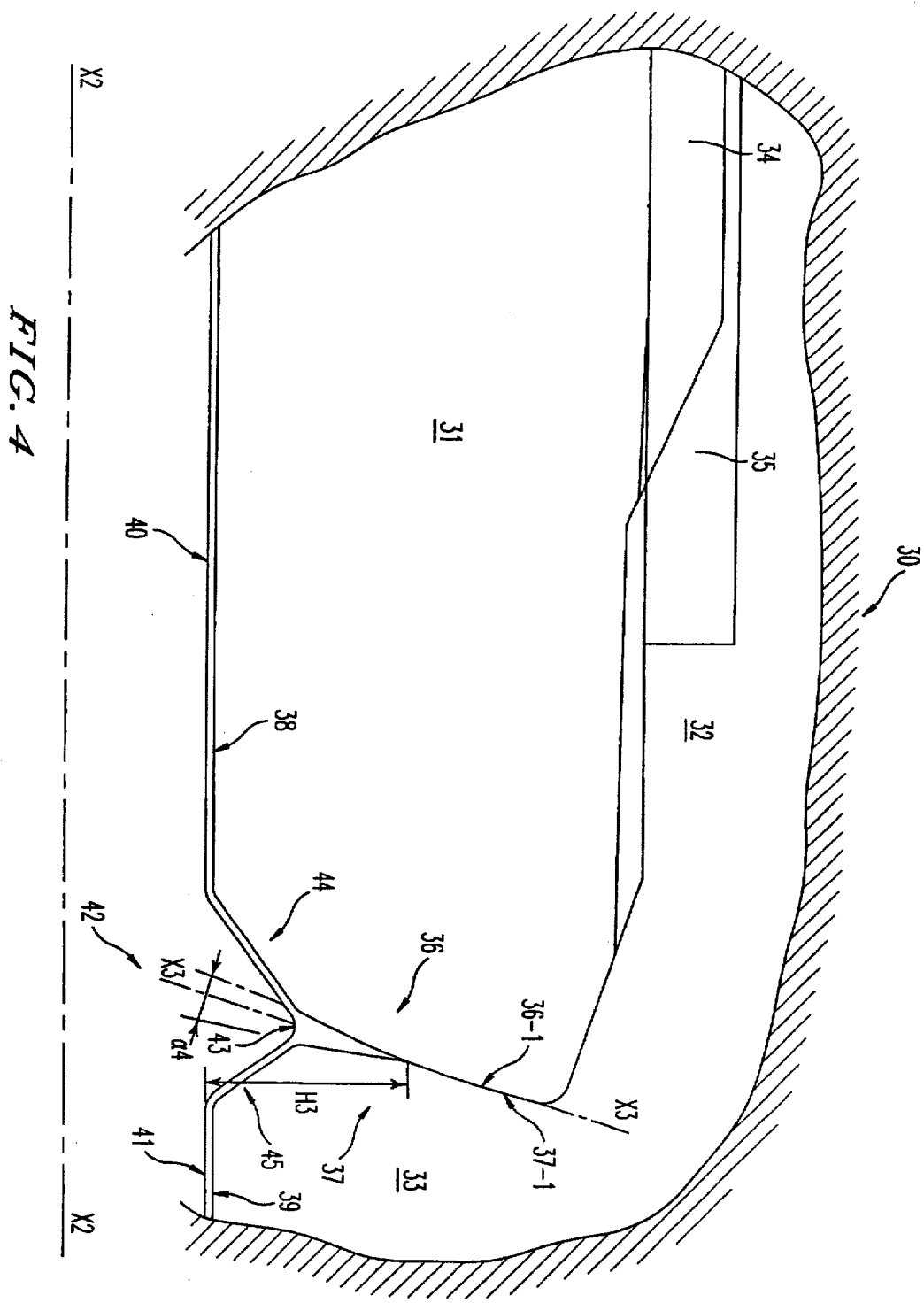

It will be appreciated that angular surfaces will be avoided at the connection of the conical surfaces 16.3, 17.3 to the tubular internal zones 14, 15, which angular surfaces can cause rupture of the layer 22, 23. A rounded configuration as illustrated in FIG. 1 or FIG. 2 at 16.4, 17.4 or a chamfer such as at 44, 45 in respect of which the connecting angles have been smoothed off by sand blasting as shown in FIG. 4 may, e.g., be used.

Figure 3:
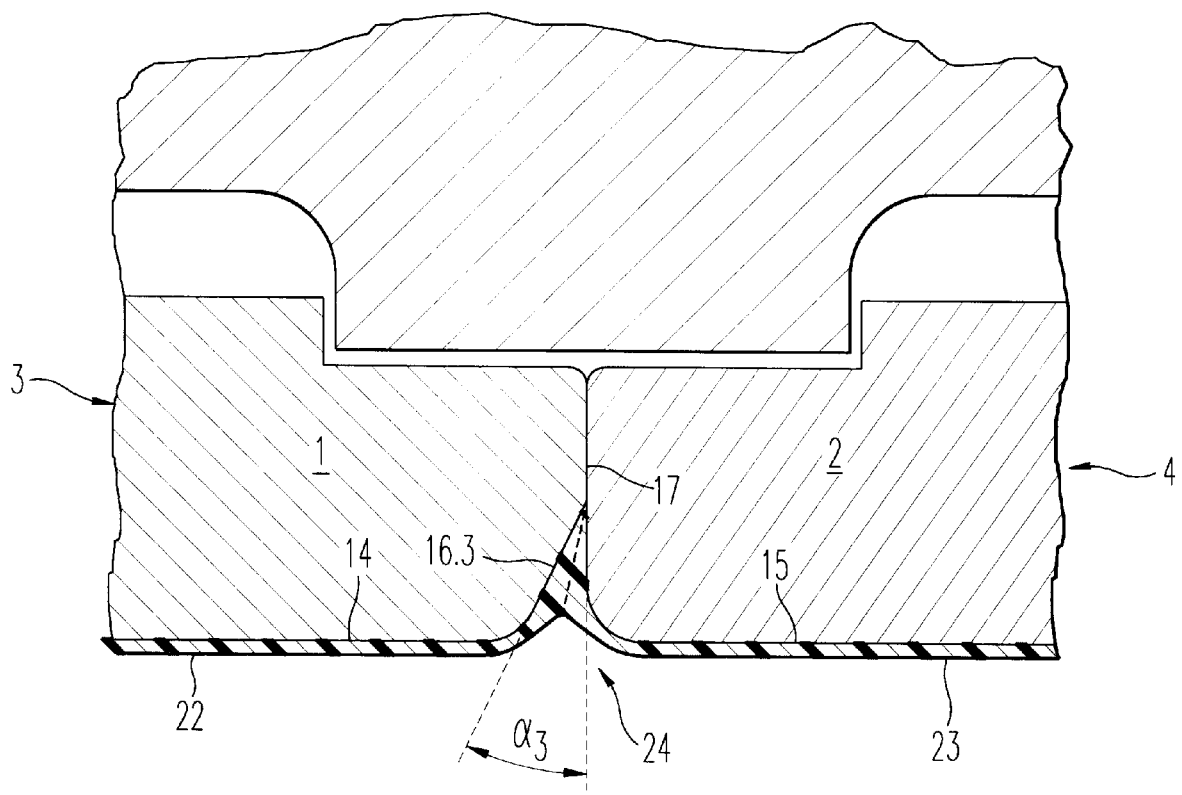
FIG. 3 is a view in section of an alternative embodiment of the joint shown in FIGS. 1 and 2 at the location of the annular zones.

FIG. 3 shows an alternative configuration of FIGS. 1 and 2.

The joint which is shown in its central part in FIG. 3 involves the same basic structure as the joint in FIG. 1 but here the progressive opening zone 24 is not symmetrical.

Instead of distributing the opening in a V-shape at the two ends of the male components 1, 2, this opening is provided solely at a single end, in this case the end 1, by making the corresponding surface 16.3 at an angle $\alpha 3$ to the plane which is perpendicular to the axis X1—X1, angle which value is substantially equal to $\alpha 1+\alpha 2$.

In this case the annular surface 17 of the end 2 is flat and perpendicular to the axis X1—X1. It will be appreciated that care will be taken to check the connecting zones connecting the annular surfaces 16 and 17 to the tubular internal zones 14, 15 in order to avoid sharp angles.

Such an embodiment as shown in FIG. 3 has the advantage of simplifying manufacture for one of the components of the joint, in this case being the component 4 which is not modified in comparison with its usual shape.

Such an arrangement is a particularly attractive proposition when the slope of the annular surface in the abutment contact zone 16.1 is conical and involves an angle such as that shown in FIG. 4 for the male component.

FIG. 4 shows in a greatly enlarged form an embodiment of a joint 30 in the assembled condition comprising a male component 31 which is screwed into a female housing 32 formed by the female component 33, the male thread 34 and the female thread 35 corresponding to each other and only the part representing the assembly of the two components being shown in section in respect of the part above axis X2—X2 of the joint.

The basic structure of the joint 30 corresponds, e.g., to a joint as described in European Patent No. 0 488 912 B2, although that detail is in no way limiting.

FIG. 4 can be applied to the situation where the female component 33 represents, with its housing 32, one side of a sleeve having a flange or collar portion, of which only one side is shown, the other side which is not shown being at the right of the Figure. FIG. 4 can also be applied to the situation where the joint is of the integral type, in which case the component 33 is the female component which is provided at the end of a tube that is generally of great length, which is not represented and which is disposed to the right of the Figure.

As FIG. 4 diagrammatically shows, this arrangement again has the annular surfaces 36, 37 which prolong the tubular internal zones 38, 39, a protective layer 40, 41 being deposited as described with reference to FIGS. 1 to 3. The end of the male component 31 comprises a male contact surface 36.1 which is tightened by screwing against a corresponding female contact surface 37.1 of the female housing 32 of an assembly sleeve or a housing of the female end of a tube portion. Those two abutment surfaces have a contact generatrix X3—X3 that is inclined at about 5° to 35° with respect to a plane which is perpendicular to the axis of the joint. The opening zone 42 comprises a total opening angle $\alpha 4$ of about 10° and the thickness of the protective layer 40, 41 is such that, in the screwed state, the opening of the V-shape is filled in respect of the major part thereof as far as the point indicated at 43 by the partially compressed layers. Under those conditions the value of H3 is, e.g., of the order of 2.5 mm, having regard to the thickness necessary for affording the connection to the zones 38, 39. As in the case of the foregoing examples, the connecting portion connecting the annular surfaces 36, 37 to the tubular internal zones 38, 39 is provided by means of curves which are of sufficient radii or, as illustrated, advantageously by means of chamfers at about 45°.

Under those conditions excellent adhesion of the protective layer is found to occur, even after a plurality of screwing-unscrewing operations. It is noted in particular that a layer which adheres to the metal is maintained in the opening zone 42, even in the vicinity of the abutment surfaces 36.1, 37.1, in spite of the expulsion of a part of the layer when it is subjected to the crushing effect produced by the metal walls of the opening zone.

It will be seen that, in these different embodiments of the joint according to the invention, the basic combination of a protective layer with a progressive opening zone adjacent to an abutment zone prevents corrosive fluids from passing towards the subjacent metal and maintains the integrity of the protective layer.

All types of thread which are known in the production of threaded joints may be used in the present invention, e.g., simple threads, step-type threads, conical threads or cylindrical threads.

This application is based on French Patent Application 95-15412, filed with the French Patent Office on Dec. 22, 1995, the entire contents of which are incorporated herein by reference.

Obviously, numerous modifications and variations of the present invention are possible in light of the above teachings. It is therefore to be understood that within the scope of the appended claims, the invention may be practices otherwise than as specifically described herein.

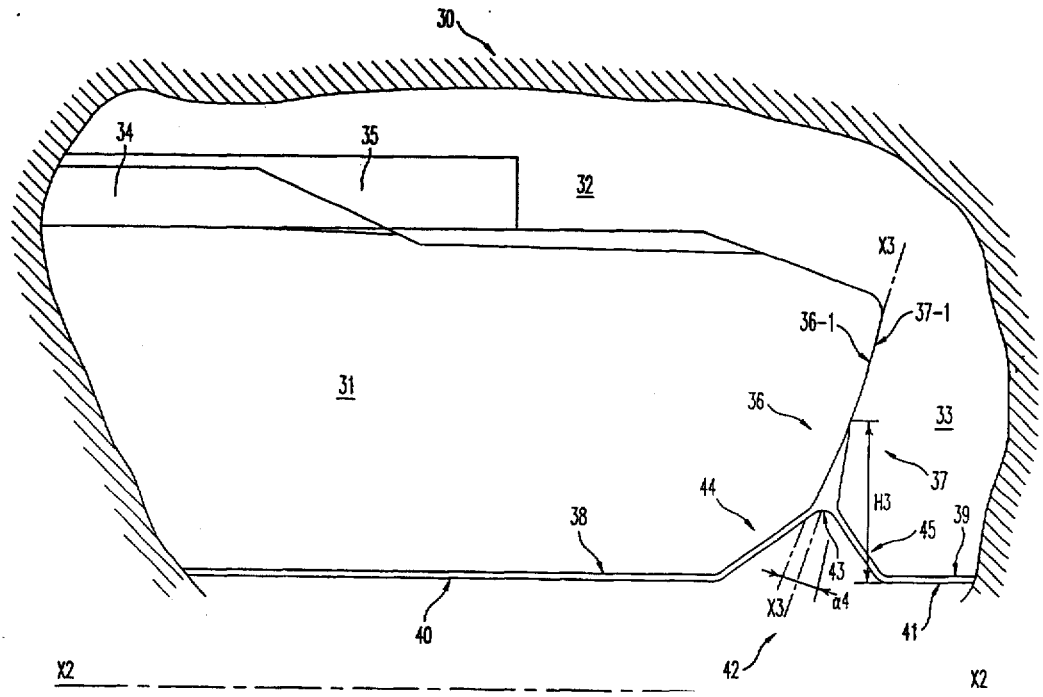

What is claimed as new and desired to be secured by Letters Patent of the United States is:

1. A threaded joint, comprising:
   a threaded tube having,
      an external surface,
      an inner surface,
      an annular end surface formed between said external surface and said inner surface and having an abutment surface portion, and
a sloped surface portion that extends along a generatrix from said abutment surface portion toward said inner surface, and
a protective layer that covers at least a portion of said inner surface and said sloped surface portion; and
a threaded connecting part that screwably mates with said threaded tube, having
another inner surface,
a connecting end surface having
an opposing abutment surface portion, and
a connecting surface that extends from said opposing abutment surface portion to said another inner surface, and
another protective layer that covers at least a portion of said another inner surface and said connecting surface, wherein
said opposing abutment surface portion of said threaded connecting part abutting in pressure contact with said abutment surface portion of said threaded tube along a contact surface when said threaded tube is screwed home to said threaded connecting part,
said sloped surface portion being angled with respect to an extension of a contact line of said contact surface, when viewed in section by a plane passing by the axis of the threaded joint, so as to create an opening zone that progressively opens between said sloped surface portion and said connecting surface,
said opening zone being at least partially filled by the protective layer and the another protective layer, which are in pressure contact with each other in said opening zone at least for a predetermined length, said predetermined length starting proximate a terminal point of said contact line, and not being filled with additional material that is not part of the protective layer and another protective layer, said protective layer being of substantially uniform thickness on said inner surface and continuing onto said sloped surface portion.

2. The threaded joint of claim 1, wherein:
said external surface of said threaded tube being a threaded external surface such that said threaded tube being a male component of said joint; and
said another inner surface of said threaded connecting part having a threaded portion such that said threaded connecting part being a female component of said joint and comprising a sleeve that accommodates another threaded tube therein.

3. The threaded joint of claim 1, wherein:
said threaded connecting part being another threaded tube.

4. The threaded joint of claim 1, wherein:
said threaded connecting part including a coupling.

5. The threaded joint of claim 4, wherein:
said coupling having
a first end that receives said threaded tube, and
another end that receives another threaded tube.

6. The threaded joint of claim 5, wherein:
the threaded connecting part includes the another threaded tube being screwed home in said another end of said coupling,
said abutment surface portion of said threaded tube abutting a corresponding abutment surface portion of said another threaded tube.

7. The threaded joint of claim 6, wherein:
said connecting surface of said threaded connecting part being another sloped surface portion of said another tube, and an axial distance between the sloped surface portion and said another sloped surface portion progressively increases from the terminal point of said contact line throughout said opening zone.

8. The joint of claim 1 wherein:
the protective layer covers a part of said abutment surface portion prior to abutting the abutment surface portion of said threaded connecting part.

9. The joint of claim 1, wherein:
said protective layer terminates at said terminal point.

10. The joint of claim 1, wherein:
the opening zone being defined by an angle of between 5° and 30°.

11. The joint of claim 1, wherein:
the opening zone being V-shaped, and an opening angle of said opening zone being distributed equally or unequally between the sloped surface portion of the annular end surface and the connecting surface of the threaded connecting part.

12. The joint of claim 1, wherein:
the protective layer being a plastic layer based on a polyepoxide.

13. The joint of claim 6, wherein:
said coupling being a coupling sleeve.

14. The joint of claim 1, wherein:
the threaded connecting part being a female component that receives the threaded tube, being a male part, which is screwed into the threaded connecting part.

15. The joint of claim 3, wherein:
the another threaded tube being a female component that receives the threaded tube, being a male part, therein so as to form an integral joint.

16. The joint of claim 1, wherein:
the threaded connecting part being a female component that receives the threaded tube, being a male part, therein so as to form an integral joint when screwed to the threaded tube.

17. The joint of claim 16, wherein:
said opposing abutment surface portion and said abutment surface portion forming a metal-metal sealing surface provided between the threaded tube and the threaded connecting part.

18. The joint of claim 13, wherein:
the coupling sleeve includes a first assembly housing at a first end thereof that receives the threaded tube being a male part and a second assembly housing at another end thereof configured to receive the another threaded tube, being another male part, therein;
said first assembly housing and said second assembly housing being separated by a flange portion having an inner wall, said inner wall serving as an inner zone.

19. The joint of claim 13, wherein:
said threaded connecting part having a second threaded tube being a male component with a metal-metal sealing surface between the male component and the coupling sleeve.

20. The joint of claim 1, wherein:
said opening zone being connected to the inner surface and the another inner surface by respective chamfers or round portions.

21. The joint of claim 1, wherein:
the protective layer being configured to protect the joint from corrosion.

22. The joint of claim 1, wherein:

the protective layer being configured to reduce a pressure drop in a fluid flowing through said threaded tube.

23. The joint of claim 11, wherein:

the predetermined length where said protective layer and said another protective layer are in pressure contact is determined by e/sin X/2, where e is a thickness of the protective layer, and X is a total angle of the opening zone.

24. The joint of claim 23, wherein:

the total angle X of the opening is not greater than 30° so as to achieve progressive decompression of the protective layer and another protective layer in the opening zone.

* * * * *

UNITED STATES PATENT AND TRADEMARK OFFICE
CERTIFICATE OF CORRECTION

PATENT NO. : 5,906,399
DATED : May 25, 1999
INVENTOR(S) : THIERRY NOEL

It is certified that error appears in the above-identified patent and that said Letters Patent is hereby corrected as shown below:

The title page, showing the illustrative figure, should be deleted and substitute therefor the attached title page.

<u>In the Drawings</u>

The Drawing Sheets, consisting of Figs. 1-4, should be deleted to be replaced with the drawing sheets, consisting of Figs. 1-4, as shown on the attached page.

Signed and Sealed this

Twenty-third Day of January, 2001

Attest:

Q. TODD DICKINSON

*Attesting Officer*   *Commissioner of Patents and Trademarks*

UNITED STATES PATENT AND TRADEMARK OFFICE
CERTIFICATE OF CORRECTION

PATENT NO. : 5,906,399  
DATED : May 25, 1999  
INVENTOR(S) : Thierry Noel

It is certified that error appears in the above-identified patent and that said Letters Patent is hereby corrected as shown below:

The title page, showing the illustrative figure, should be deleted and substitute therefor the attached title page.

Drawings,
The Drawing Sheets, consisting of Figs. 1-4, should be deleted to be replaced with the drawing sheets, consisting of Figs. 1-4, as shown on the attached pages.

Signed and Sealed this

Twenty-ninth Day of January, 2002

Attest:

JAMES E. ROGAN  
Attesting Officer — Director of the United States Patent and Trademark Office

United States Patent [19]
Noel

[11] Patent Number: 5,906,399
[45] Date of Patent: May 25, 1999

[54] THREADED JOINT FOR METAL TUBES WITH INTERNAL COATING

[75] Inventor: Thierry Noel, Sebourg, France

[73] Assignee: Vallourec Oil & Gas, Aulnoye-Aymeries, France

[21] Appl. No.: 08/772,465
[22] Filed: Dec. 23, 1996

[30] Foreign Application Priority Data

Dec. 22, 1995 [FR] France ................... 95 15412

[51] Int. Cl.⁶ .................................. F16L 25/00
[52] U.S. Cl. .......................... 285/55; 285/333
[58] Field of Search ............... 285/55, 333, 355

[56] References Cited

U.S. PATENT DOCUMENTS

| | | | |
|---|---|---|---|
| 2,532,632 | 12/1950 | MacArthur | 285/55 |
| 3,100,656 | 8/1963 | MacArthur | |
| 3,192,612 | 7/1965 | Elliott et al. | |
| 3,489,437 | 1/1970 | Duret | 285/55 |
| 3,499,666 | 3/1970 | Turner | 285/55 |
| 4,373,750 | 2/1983 | Mantelle et al. | |
| 4,568,113 | 2/1986 | Axford et al. | 285/55 |
| 4,856,828 | 8/1989 | Kessler et al. | 285/55 |
| 4,875,713 | 10/1989 | Carstensen | |
| 5,236,230 | 8/1993 | Mudge, Jr. et al. | |

FOREIGN PATENT DOCUMENTS

| | | |
|---|---|---|
| 027771 | 4/1981 | European Pat. Off. |
| 0 094 509 | 11/1983 | European Pat. Off. |
| 0 488 912 | 6/1992 | European Pat. Off. |
| 1 947 306 | 4/1971 | Germany |
| 446334 | 1/1950 | Italy ................... 285/55 |
| 7-301375 | 11/1995 | Japan |
| WO 89/08214 | 9/1989 | WIPO |

Primary Examiner—Eric K. Nicholson
Attorney, Agent, or Firm—Oblon, Spivak, McClelland, Maier & Neustadt, P.C.

[57] ABSTRACT

The invention concerns threaded joints for tubes, having a layer intended in particular to protect the tubes and the joints from corrosion or to improve the conditions for a flow of fluids. The joint comprises two tubular threaded components each provided with a radial annular surface. The internal wall of the components and the annular surfaces are covered with a layer. The shape of the annular surfaces is such that in the screwed state those surfaces are partially in abutment contact at their external portion, their internal portion creating a progressive opening zone which is at least partially filled by the layers of the two components.

24 Claims, 4 Drawing Sheets